United States Patent
Bao

(10) Patent No.: US 10,878,004 B2
(45) Date of Patent: Dec. 29, 2020

(54) KEYWORD EXTRACTION METHOD, APPARATUS AND SERVER

(71) Applicant: TENCENT TECHNOLOGY (SHENZHEN) COMPANY LIMITED, Shenzhen (CN)

(72) Inventor: Xiao Bao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 147 days.

(21) Appl. No.: 16/263,364

(22) Filed: Jan. 31, 2019

(65) Prior Publication Data

US 2019/0163690 A1 May 30, 2019

Related U.S. Application Data

(63) Continuation of application No. PCT/CN2017/108262, filed on Oct. 30, 2017.

(30) Foreign Application Priority Data

Nov. 10, 2016 (CN) .......................... 2016 1 1039501

(51) Int. Cl.
*G06F 40/30* (2020.01)
*G06F 16/31* (2019.01)
(Continued)

(52) U.S. Cl.
CPC .......... *G06F 16/313* (2019.01); *G06F 40/216* (2020.01); *G06F 40/284* (2020.01);
(Continued)

(58) Field of Classification Search
CPC ..... G06F 16/313; G06F 17/02; G06K 9/6228; G06K 9/6256
(Continued)

(56) References Cited

U.S. PATENT DOCUMENTS

2009/0228468 A1\* 9/2009 Qin ........................ G06F 16/313
2010/0153318 A1\* 6/2010 Branavan ................ G06F 16/35
706/12
(Continued)

FOREIGN PATENT DOCUMENTS

CN 101196904 A 6/2008
CN 102054006 A 5/2011
(Continued)

OTHER PUBLICATIONS

International Search Report for PCT/CN2017/108262 dated Jan. 29, 2018 [PCT/ISA/210].
(Continued)

*Primary Examiner* — Jesse S Pullias
(74) *Attorney, Agent, or Firm* — Sughrue Mion, PLLC

(57) ABSTRACT

A keyword extraction method is provided. A candidate keyword from target text is extracted by a server. For each candidate keyword, each effective feature corresponding to the candidate keyword is obtained by the server. Calculation is performed by the server according to each effective feature corresponding to the candidate keyword and a weighting coefficient respectively corresponding to each effective feature, to obtain a probability that the candidate keyword belongs to a target keyword, and the candidate keyword is determined as the target keyword of the target text based on the probability.

18 Claims, 8 Drawing Sheets

(51) Int. Cl.
*G06F 40/216* (2020.01)
*G06F 40/284* (2020.01)
*G06K 9/62* (2006.01)

(52) U.S. Cl.
CPC .......... *G06F 40/30* (2020.01); *G06K 9/6228* (2013.01); *G06K 9/6256* (2013.01)

(58) Field of Classification Search
USPC .......................... 704/1, 9, 10, 257, 270–275
See application file for complete search history.

(56) References Cited

U.S. PATENT DOCUMENTS

| | | | |
|---|---|---|---|
| 2011/0153783 A1* | 6/2011 | Lee ........................ | G06Q 30/02 709/219 |
| 2012/0078631 A1* | 3/2012 | Sun ........................ | G06F 40/284 704/254 |
| 2012/0117092 A1* | 5/2012 | Stankiewicz ....... | G06F 16/3329 707/755 |
| 2013/0031083 A1* | 1/2013 | Madhavan ............ | G06F 16/951 707/713 |
| 2015/0254714 A1* | 9/2015 | Zhuang ............... | G06F 16/3322 705/14.54 |

FOREIGN PATENT DOCUMENTS

| | | |
|---|---|---|
| CN | 103425677 A | 12/2013 |
| CN | 103473317 A | 12/2013 |
| CN | 103605665 A | 2/2014 |
| CN | 103678422 A | 3/2014 |
| CN | 105843850 A | 8/2016 |
| KR | 101536520 B1 | 7/2015 |

OTHER PUBLICATIONS

Communication dated Mar. 20, 2020, from the State Property Office of the P.R.C in application No. 201611039501.6.

Written Opinion in International Application No. PCT/CN2017/108262, dated Jan. 29, 2018.

Communication dated Nov. 5, 2019, from the State Intellectual Property Office of the P.R. of China in counterpart Application No. 201611039501.6.

O. Chapelle et al., "Click-Through Rate Predictions, Gradient Boost Decision Tree", CSDN, Aug. 27, 2015, https://blog.csdn.net/lilyth_lilyth/article/details/48032119, pp. 1-2 (2 pages total).

* cited by examiner

KEYWORD EXTRACTION METHOD, APPARATUS AND SERVER

CROSS-REFERENCE TO RELATED APPLICATION(S)

This application is a continuation of International Application No. PCT/CN2017/108262, filed on Oct. 30, 2017, in the Chinese Patent Office, which claims priority to Chinese Patent Application No. 201611039501.6, entitled "KEYWORD EXTRACTION METHOD AND APPARATUS" filed with the Patent Office of China on Nov. 10, 2016, the disclosures of which are incorporated by reference in their entireties.

BACKGROUND

1. Field

Methods, apparatuses, and severs consistent with exemplary embodiments relate to information processing technologies, and in particular, to a keyword extraction method, an apparatus, and a server.

2. Description of the Related Art

The keyword extraction (or referred to as keywords extraction) technologies are technologies of extracting a keyword from text. The keyword extraction technologies are widely applied to a lot of service fields such as information services, search services, and advertisement services.

Some mainstream keyword extraction technologies extract a keyword based on a term frequency feature, for example, a keyword extraction technology based on the term frequency-inverse document frequency (TF-IDF) algorithm and a keyword extraction technology based on the TextRank algorithm. In an actual application, it is found that precision of a keyword extracted by only considering the term frequency feature is low, and it is also needed to consider other features such as a location at which a word appears in text, correlation between the word and a subject of the text, and a part of speech of the word.

SUMMARY

One or more example embodiments provide a keyword extraction method, an apparatus, and a server, which solve the problems that a keyword extraction process is excessively complex and precision is low in the related art. According to an aspect of an exemplary embodiment, provided is a keyword extraction method. A candidate keyword from target text is extracted by a server. For each candidate keyword, each effective feature corresponding to the candidate keyword is obtained by the server. A probability that the candidate keyword belongs to a target keyword is obtained by the server according to each effective feature corresponding to the candidate keyword and a weighting coefficient respectively corresponding to each effective feature, and the candidate keyword is determined as the target keyword of the target text based on the probability.

According to an aspect of another exemplary embodiment, provided is a keyword extraction apparatus, including: at least one memory configured to store computer program code; and at least one processor configured to access the at least one memory and operate according to the computer program code, the computer program code including: extraction code configured to cause the at least one processor to extract a candidate keyword from target text; first obtaining code configured to cause the at least one processor to obtain, for each candidate keyword, each effective feature corresponding to the candidate keyword; and first determining code configured to cause the at least one processor to obtain a probability that the candidate keyword belongs to a target keyword according to each effective feature corresponding to the candidate keyword and a weighting coefficient respectively corresponding to each effective feature, and determine the candidate keyword as the target keyword of the target text based on the probability.

According to an aspect of another exemplary embodiment, provided is a non-transitory computer readable media, storing a plurality of instructions, the plurality of instructions, when executed by one or more processors in a server, cause the one or more processors to perform: extracting a candidate keyword from target text; obtaining, for each candidate keyword, each effective feature corresponding to the candidate keyword; and performing calculation according to each effective feature corresponding to the candidate keyword and a weighting coefficient respectively corresponding to each effective feature, to obtain a probability that the candidate keyword belongs to a target keyword, and determining the candidate keyword as the target keyword of the target text based on the probability.

Beneficial effects of the technical solutions provided by exemplary embodiments include:

Calculation is performed according to each effective feature corresponding to the candidate keyword and a weighting coefficient respectively corresponding to each effective feature, and the candidate keyword is determined as the target keyword of the target text based on a probability that the candidate keyword belongs to the target keyword. Accordingly, using manually formulated rules is not required, thereby avoiding a problem that a keyword extraction process is excessively complex because of a relatively large quantity of manually formulated rules, also avoiding a problem that an accurate rate of keyword extraction is lowered because of a defect that manually formulated rules are unavoidably improper or inaccurate. Therefore, the technical solutions can reduce complexity of keyword extraction, and improve accuracy of keyword extraction. In addition, determining whether a keyword is the target keyword is performed based on effective features, and features that are ineffective for determining the target keyword are excluded. Therefore, an amount of calculation can be reduced, and precision of keyword extraction can be improved.

BRIEF DESCRIPTION OF THE DRAWINGS

The above and/or other aspects will become apparent and more readily appreciated by describing certain exemplary embodiments with reference to the accompanying drawings, in which.

DETAILED DESCRIPTION

To make the objectives, technical solutions, and advantages clearer, the following further describes exemplary implementations of the disclosure in detail with reference to the accompanying drawings.

Technical solutions provided by the exemplary embodiments are mainly used for extracting a keyword in text. In the exemplary embodiments, a type of text is not limited, and may be, for example, an article, a web page, a document, and the like. Keyword extraction is involved in many application scenarios. For example, a keyword extracted from text is used as a tag of the text, a type of text is determined according to a keyword extracted from the text, a keyword extracted from text is used as an index of the text for searching the text, and so on.

One or more methods provided by the exemplary embodiments may be executed by a server. For example, the server may be one server, a server cluster constituted by several servers, or a cloud computing service center.

Figure 1A:
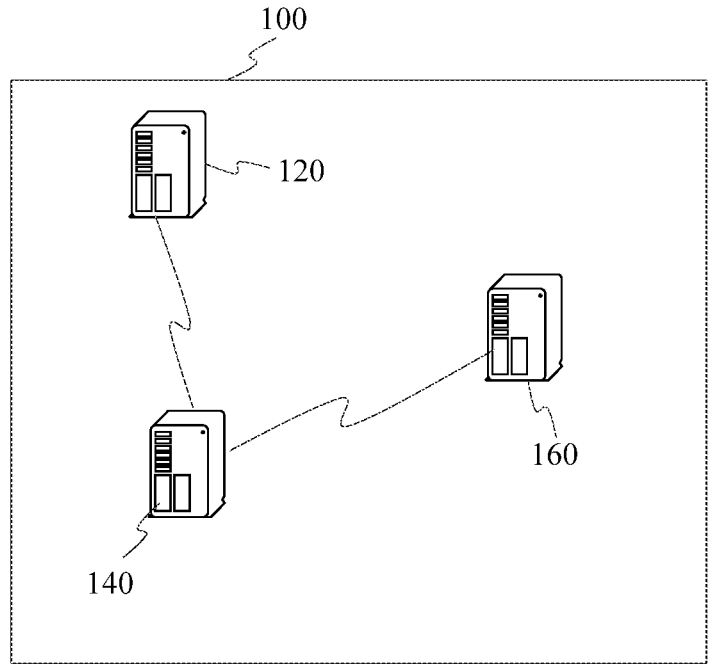
FIG. 1A is an architectural diagram of a server according to an embodiment.

FIG. 1A is an architectural diagram of a server 100 according to an embodiment. As shown in FIG. 1 A, the server 100 may include a server configured to implement a keyword extraction platform 120. Optionally, the server 100 may further include a server configured to implement a keyword management platform 140. Optionally, the server 100 may further include a server configured to implement a keyword application platform 160.

Optionally, the keyword extraction platform 120 includes: a server configured to extract a keyword from text.

Optionally, the keyword management platform 140 includes: a server configured to store and manage a keyword, extracted by the keyword extraction platform 120, of each piece of text.

Optionally, the keyword application platform 160 includes: a server configured to provide, according to the keyword of each piece of text, an application service related to the keyword to a terminal.

It should be noted that the servers configured to implement the keyword extraction platform 120, the keyword management platform 140, and the keyword application platform 160 may be servers independent of each other; or two of the keyword extraction platform 120, the keyword management platform 140, and the keyword application platform 160 may be implemented in a same server, and the other platform may be implemented in another server; or a same server is configured to implement the foregoing three platforms. When the foregoing three platforms are implemented in two or three servers, the two or three servers are connected to each other through a communication network.

Optionally, the server 100 may be connected to a management device (not shown in FIG. 1A), and the management device is connected to the server 100 through a communication network. Optionally, the communication network is a wired network or a wireless network.

Optionally, the foregoing wireless network or wired network uses a standard communication technology and/or protocol. The network may be the Internet, or may alternatively be any network, and includes, but is not limited to, any combination of a local area network (LAN), a metropolitan area network (MAN), a wide area network (WAN), a mobile, wired, or wireless network, a private network, or a virtual private network. In some embodiment, data exchanged through a network is represented by a technology and/or format including the Hyper Text Mark-up Language (HTML), the Extensible Markup Language (XML), and the like. In addition, all or some links may be further encrypted by using common encryption technologies such as the Secure Socket Layer (SSL), the Transport Layer Security (TLS), the Virtual Private Network (VPN), and the Internet Protocol Security (IPsec). In some embodiment, the data communication technologies may be alternatively replaced or implemented by using customized and/or dedicated data communication technologies.

To facilitate description, in the following method embodiments, each operation may be executed by a server as an example for description.

Figure 1B:
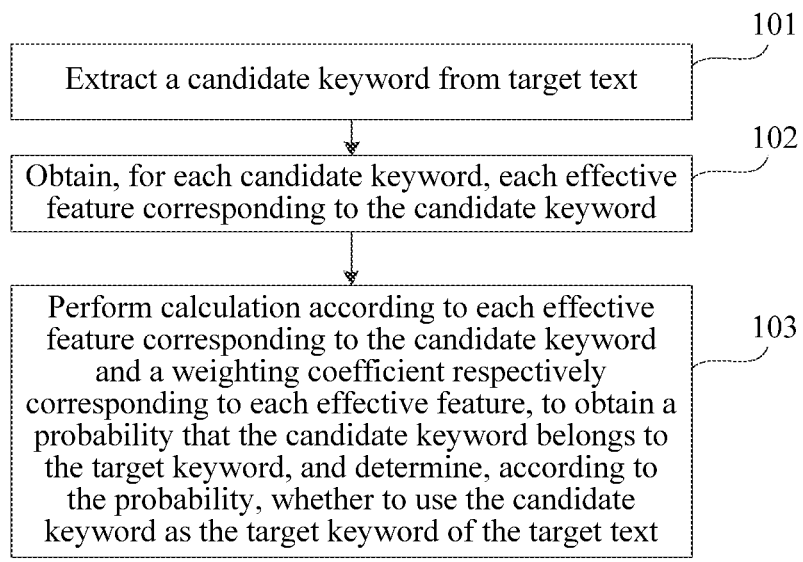
FIG. 1B is a flowchart of a keyword extraction method according to an embodiment.

FIG. 1B is a flowchart of a keyword extraction method according to an embodiment. The method may include operations 101-103.

Operation 101: Extract a candidate keyword from target text.

The target text refers to text from which a keyword is to be extracted. For example, the target text may be a news article, including a title and a main body of the new article. The candidate keyword refers to a word that is preliminarily selected by filtration from target text and that is likely to be used as a target keyword.

In an example, operation 101 includes the following sub-operations:

Operation 101a: Perform word segmentation on target text to obtain a plurality of words.

Operation 101b: Select a word that belongs to a reset lexicon from the plurality of words as a candidate keyword.

The preset lexicon may include a plurality of words. For a word obtained by word segmentation in the target text, if the word exists in the preset lexicon, the word is selected as a candidate keyword, and if the word does not exist in the preset lexicon, it is determined that the word is not a candidate keyword. In the foregoing manner, it is not needed to distinguish whether each word in the target text is a target keyword, and instead, the word is directly compared with a word in the preset lexicon. It helps to reduce an amount of calculation and improve efficiency of keyword extraction.

The preset lexicon refers to a lexicon constituted by words that are preset and that can be selected as the target keyword. In an example, when an application scenario is using a target keyword extracted from text as a tag of the text, if words that can be used as tags are preset, the words that can be used as tags are add to the preset lexicon.

Optionally, for different types of text, different preset lexicons may be correspondingly set. Using a news article as an example, its types may include news, entertainment, sports, military affairs, and the like. A preset lexicon corresponding to each type of text refers to a lexicon that is preset and that is constituted by words that can be selected as keywords of this type of text. For example, a preset lexicon corresponding to text of the entertainment type includes entertainment related words such as names of entertainment starts, titles of movies and dramas, and names of variety shows. For another example, a preset lexicon correspond to text of the sports type includes sports related words such as names of sports stars, names of individual sports, and names of ball game teams. The foregoing operation 101*b* may include: obtaining a type to which target text belongs, and selecting, from a plurality of words obtained by performing word segmentation on the target text, a word in a preset lexicon that belongs to the type to which the target text belongs as a candidate keyword. In the foregoing manner, the extracted candidate keyword can be more correlated to the type of the text.

Operation 102: Obtain, for each candidate keyword, each effective feature corresponding to the candidate keyword.

In an exemplary embodiment, the effective feature may also be referred to as a distinguishing feature and refers to a feature having a distinguishing function for determining a target keyword. For example, the effective feature may be a feature used for determining whether a keyword is a target keyword. A keyword may have following characteristics: appearing in a title of text, appearing in text many times, conforming to a semantic meaning expressed by text, and occupying a substantial portion of text. Thus, a keyword in text generally has influence (or location influence) on a location at which the keyword appears in text, influence (or frequency influence) on a frequency at which the keyword appears, influence (or semantic influence) on a semantic meaning expressed by text, and/or influence (or coverage influence) on a portion of text covered by the keyword. Based on analysis on the foregoing features, effective features affecting keyword extraction can be classified at least into the following four types: a term frequency feature, a location feature, a semantic feature, and a linguistic feature.

The term frequency feature is a feature used for indicating a frequency at which a word appears in text. For example, the term frequency feature may include: a frequency-inverse document frequency (TF-IDF) corresponding to a word, a ratio of a quantity of paragraphs in which the word appears in text to a total quantity of paragraphs of the text, and the like. The location feature is a feature used for indicating a location at which a word appears in text. For example, the location feature may include: a location at which a word appears in text for the first time, whether the word appears in a title of the text, a ratio of a span length between the location at which the word first appears in the text and a location at which the word finally appears in the text to a total length of the text, and the like. The semantic feature is a feature used for indicating correlation between a word and a subject of text. For example, the semantic feature may include: correlation between a word and a subject of text, correlation between the word and a Latent Dirichlet Allocation (LDA, a document subject generation model) subject, and the like. The linguistic feature is a feature used for indicating a basic attribute of a word. For example, the linguistic feature may include: a word length, a part of speech (such as a noun, a verb, or an adjective), classification of a word (such as a personal name or a place name), and the like.

Figure 2A:
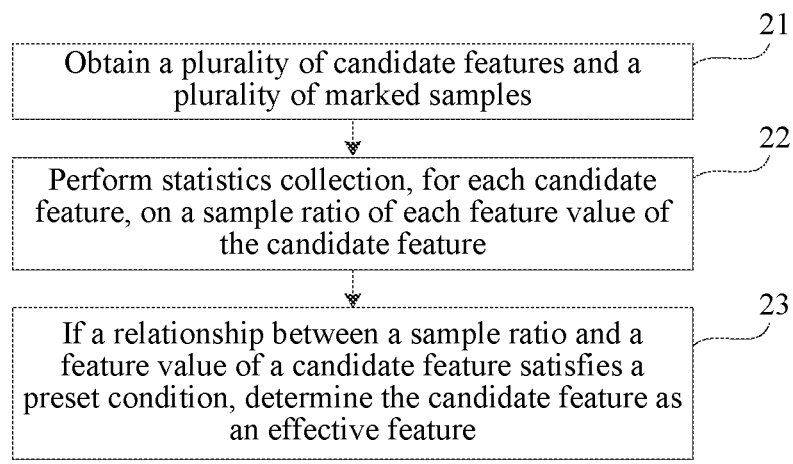
FIG. 2A is a flowchart of a feature filtering process.

In an example, as shown in FIG. 2 A, a large quantity of candidate features that may affect keyword extraction can be preset, and an effective feature is selected by filtration from the large quantity of candidate features in the following manner:

Operation 21: Obtain a plurality of candidate features and a plurality of marked samples.

The marked sample refers to text in which a target keyword has been marked. The candidate feature refers to a preset feature that may have a distinguishing function for determining a target keyword. A target keyword in each marked sample is observed, and its feature is analyzed, so as to conclude a series of candidate features.

Operation 22: Perform statistics collection, for each candidate feature, on a sample ratio of each feature value of the candidate feature.

The sample ratio is a positive sample ratio or a negative sample ratio, the positive sample ratio refers to a ratio of a quantity of positive samples in the marked samples to a quantity of the marked samples, the negative sample ratio refers to a quantity of negative samples in the marked samples to the quantity of the marked samples, the positive sample refers to a marked sample in which a target keyword satisfying a feature value of the candidate feature exists, and the negative sample refers to a marked sample in which a target keyword satisfying a feature value of the candidate feature does not exist.

In an example, using a candidate feature being a location at which a word appears in text for the first time, it is assumed that a quantity of marked samples is 100, a quantity of marked samples in which a location at which a keyword appears for the first time is paragraph 1 is 60, a quantity of marked samples in which a location at which a keyword appears for the first time is paragraph 2 is 20, and a quantity of marked samples in which a location at which a keyword appears for the first time is paragraph 3 is 20; when a feature value is paragraph 1, a quantity of positive samples is 60, a quantity of negative samples is 40, a positive sample ratio is 0.6, and a negative sample ratio is 0.4; and when a feature value is paragraph 2, a quantity of positive samples is 20, a quantity of negative samples is 80, a positive sample ratio is 0.2, and a negative sample ratio is 0.8.

Operation 23: If a relationship between a sample ratio and a feature value of a candidate feature satisfies a preset condition, determine the candidate feature as an effective feature.

Optionally, the foregoing preset condition may be that a relationship between a sample ratio and a feature value of a candidate feature may be monotonically increasing or monotonically decreasing. If a candidate feature satisfies the foregoing preset condition, it can be considered that the candidate feature is an effective feature having a distinguishing function for determining a target keyword.

Each determined effective feature is used as a basis for determining a keyword extracted from any piece of target text as a target keyword. For example, 50 effective features are selected by filtration in advance from thousands of candidate features by means of the foregoing operation 21 to operation 23, and when a target keyword is subsequently extracted from any piece of target text, an effective feature corresponding to each candidate keyword is one of the 50 effective features.

Figure 2B:
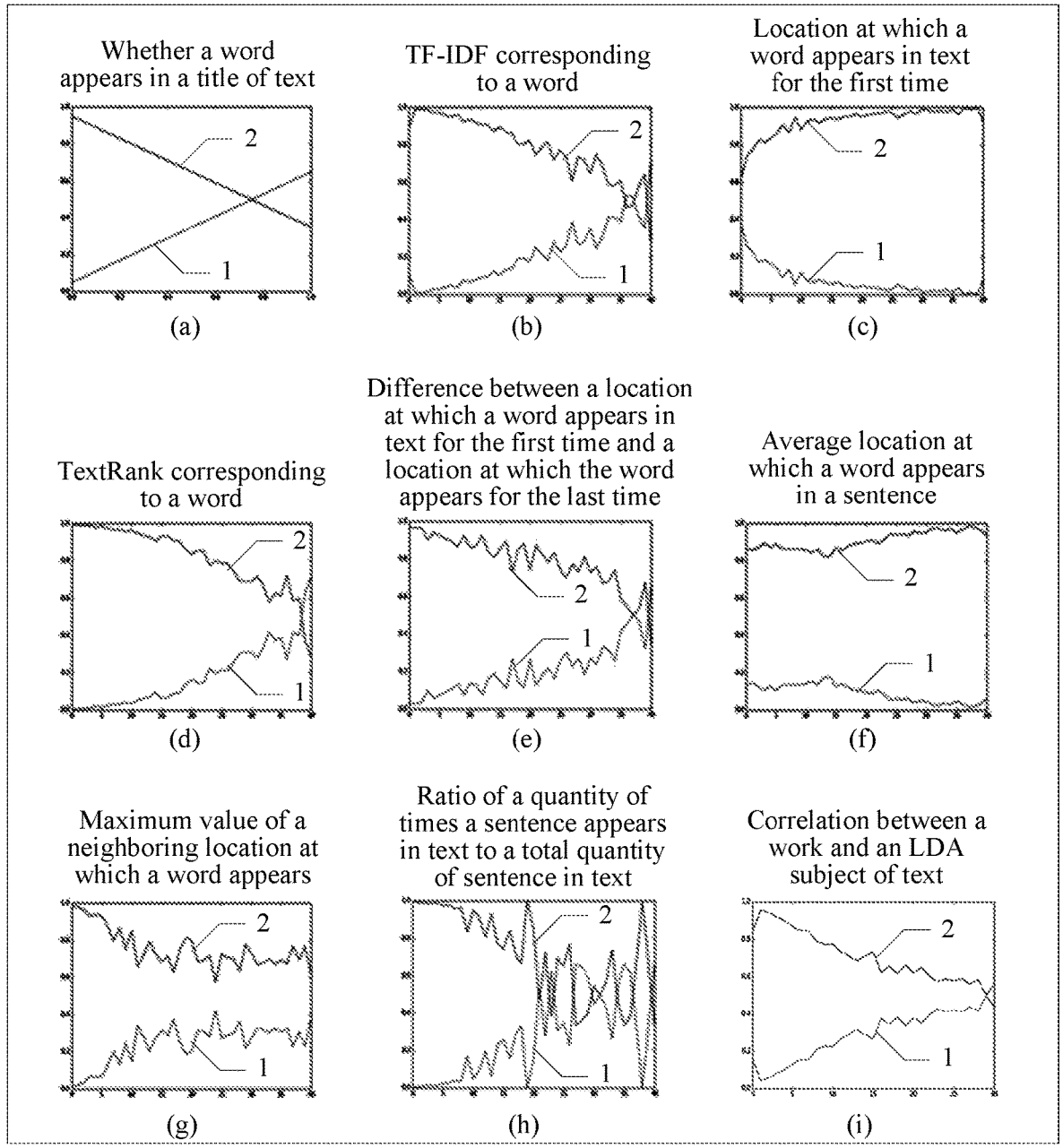
FIG. 2B is a schematic diagram of relationships between sample ratios and feature values corresponding to several candidate features.

FIG. 2B is a schematic diagram of relationships between sample ratios and feature values corresponding to several candidate features.

In each figure shown in FIG. 2B, a horizontal coordinate represents a feature value of a candidate feature, and a horizontal coordinate represents a sample ratio. In each figure shown in FIG. 2B, a curve 1 represents a positive sample ratio, and a curve 2 represents a negative sample ratio. It could be learned from FIG. 2B that candidate features, such as whether a word appears in a title of text, a TF-IDF corresponding to a word, a TextRank corresponding to a word, a difference between a location at which a word appears in text for the first time and a location at which the word appears for the last time, correlation between a word and an LDA subject of text, can be selected as effective features. In addition, when an effective feature is selected according to a relationship between a sample ratio and a feature value of a candidate feature, reference may be made to a slope of a curve. A candidate feature having a larger slope is more valuable and can be preferentially selected as an effective feature.

In an actual application, dozens of effective features may be selected by filtration from more than 2000 candidate features (for example, may include more than 20 term frequency features and location features, more than 2000 semantic features, and more than 50 linguistic features).

Operation 103: Perform calculation according to each effective feature corresponding to the candidate keyword and a weighting coefficient respectively corresponding to each effective feature, to obtain a probability that the candidate keyword belongs to the target keyword, and determine, according to the probability, whether to use the candidate keyword as the target keyword of the target text.

In an example implementation, a weighting coefficient respectively corresponding to each effective feature may be calculated in advance according to an algorithm, or may be obtained by performing training by using a model. In an example, a feature value of each effective feature corresponding to a candidate keyword may be multiplied with a weighting coefficient corresponding to the effective feature, to obtain a multiplication result, and multiplication results corresponding to each effective feature are accumulated to obtain a probability that the candidate keyword belongs to a target keyword.

When it is determined whether to use the candidate keyword as the target keyword of target text according to the probability, a candidate keyword whose probability is greater than a probability threshold is determined as the target keyword of the target text, that is, when the probability of the candidate keyword is greater than the probability threshold, the candidate keyword is determined as the target keyword of the target text. The magnitude of the probability threshold can be set according to an extraction precision requirement of the target keyword. If the extraction precision requirement of the target keyword is not high, a relatively low probability threshold can be set, and if the extraction precision requirement of the target keyword is relatively high, a relatively high probability threshold can be set.

For example, if the probability threshold is set to 0.5, when the probability that the candidate keyword belongs to the target keyword is greater than 0.5, it is determined that the candidate keyword is used as the target keyword of the target text, and when the probability that the candidate keyword belongs to the target keyword is less than 0.5, it is determined that the candidate keyword is not used as the target keyword of the target text.

Optionally, the method provided in an exemplary embodiment may further include: constructing a keyword evaluation model in advance, performing calculation by using the keyword evaluation model according to each effective feature corresponding to the candidate keyword and a weighting coefficient respectively corresponding to each effective feature, to obtain a probability that the candidate keyword belongs to the target keyword, and determine, according to the probability, whether to use the candidate keyword as the target keyword of the target text.

The keyword evaluation model may be a classification model. In this case, the foregoing operation 103 may be implemented by being replaced with the following operations: inputting each effective feature corresponding to the candidate keyword to a keyword evaluation model, and determining whether to use the candidate keyword as the target keyword of the target text by using the keyword evaluation model. The effective feature corresponding to the candidate keyword may be input to the keyword evaluation model in a feature vector form. For a training process of the keyword evaluation model, refer to the description below.

In an example, the keyword evaluation model is an LR model constructed based on the logistic regression (LR) algorithm. The LR model is a linear classification model, has a simple model structure and a better classification effect, and has an existing library (lib). After a keyword extraction problem is converted into a binary classification problem by using the LR model, training may be performed by using the LR algorithm to obtain a weighting coefficient respectively corresponding to each effective feature, thereby avoiding inappropriate manual formation of a rule.

In the related art, a keyword extraction method of rule-based multi-feature fusion is provided and its specific procedure includes the following: performing word segmentation on target text to obtain a plurality of words; calculating a keyword score of each word by using the TF-IDF algorithm or the TextRank algorithm; selecting several words having relatively high keyword scores as candidate keywords; and then, extracting a keyword from the candidate keywords according to some manually formulated rules. For example, a candidate keyword having a low term frequency and a candidate keyword having a high recall term frequency are filtered out; for another example, a candidate keyword unrelated to the subject of the text is filtered out, and a candidate keyword related to the subject of the text is recalled; for still another example, a candidate keyword that appears in a title of the text and that is enclosed by quotation marks is recalled; and so on. After a series of filtering and recalling are performed on the candidate keywords according to the manually formulated rules, and the candidate keyword that remains finally is used as the keyword of the text.

In the related art, although that features in many aspects need to be comprehensively considered for keyword extraction is taken into consideration, because rules for filtering and recalling a candidate keyword are manually formulated, if a relatively large quantity of features are considered, it is needed to formulate a large quantity of rules, a keyword extraction process is excessively complex. In addition, some problems unavoidably exist in manually formulated rules. For example, the rules are not proper or accurate enough. Consequently, precision of keyword extraction is low.

In contrast, in the method provided in an exemplary embodiment, calculation is performed according to each effective feature corresponding to the candidate keyword and a weighting coefficient respectively corresponding to each effective feature, a probability that the candidate keyword belongs to the target keyword is obtained, and whether to use the candidate keyword as the target keyword of the target text is determined according to the probability, so that use of a feature does not need to be implemented by using manually formulated rules, thereby avoiding a problem that a keyword extraction process is excessively complex because of a relatively large quantity of manually formulated rules, also avoiding a problem that an accurate rate of keyword extraction is low because of a defect that manually formulated rules are unavoidably improper or inaccurate, reducing complexity of keyword extraction, and improving accuracy of keyword extraction. In addition, effective features used for determining whether a keyword is the target keyword are obtained, keyword determining is performed according to the keywords, and features that do not have a distinguishing feature for determining the target keyword are excluded, so that an amount of calculation can be reduced, as well as precision of keyword extraction can be improved.

In addition, whether to use a candidate keyword as a target keyword of target text is further determined by using a keyword evaluation model, and a weighting coefficient respectively corresponding to each feature can be obtained by performing training by using the model, so that a value of each weighting coefficient is more accurate, thereby further improving precision of keyword extraction.

Figure 3:
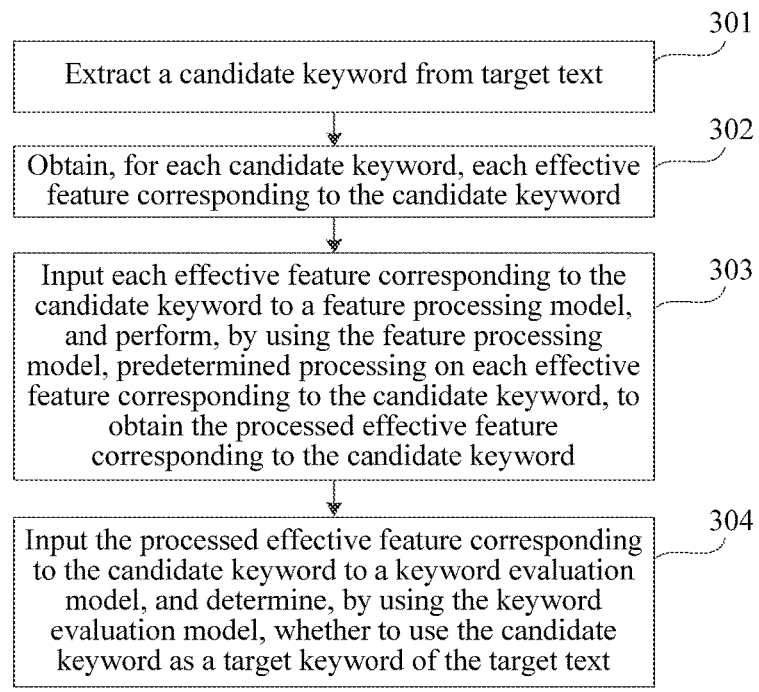
FIG. 3 is a flowchart of a keyword extraction method according to another embodiment.

FIG. 3 is a flowchart of a keyword extraction method according to another embodiment. In the method shown in FIG. 3, detailed descriptions in FIG. 1B may be referred to for content the same as or similar to that of the method shown in FIG. 1B. Repetitive details are not described herein. The method may include the following operations.

Operation 301: Extract a candidate keyword from target text.

Operation 302: Obtain, for each candidate keyword, each effective feature corresponding to the candidate keyword.

Operation 303: Input each effective feature corresponding to the candidate keyword to a feature processing model, and perform, by using the feature processing model, predetermined processing on each effective feature corresponding to the candidate keyword, to obtain the processed effective feature corresponding to the candidate keyword.

In an exemplary embodiment, the feature processing model is used for performing predetermined processing on the effective feature obtained in operation 302, to obtain the processed effective feature. The predetermined processing includes, but is not limited to, at least one of continuous feature discretization processing and feature combination processing. The effective feature corresponding to the candidate keyword may be input into feature processing model in a feature vector form, predetermined processing is performed by using the feature processing model, and the processed effective feature corresponding to the candidate keyword is output in the feature vector form. In an exemplary embodiment, the processed effective feature corresponding to the candidate keyword is used as input of the keyword evaluation model.

In an example, the feature processing model is a gradient boosting decision tree (GBDT) model constructed based on the GBDT algorithm. An input parameter of the GBDT model word is an effective feature corresponding to a word, and the GBDT model includes a plurality of decision trees. Each leaf node of the decision tree corresponds to a processed effective feature. The GBDT model can replace complex manual feature engineering, and can implement automated processing on a feature without manually processing the feature.

Operation 304: Input the processed effective feature corresponding to the candidate keyword to a keyword evaluation model, and determine, by using the keyword evaluation model, whether to use the candidate keyword as a target keyword of the target text.

In an exemplary embodiment, the keyword evaluation model is used for calculating, according to each processed effective feature corresponding to the candidate keyword and a weighting coefficient respectively corresponding to each processed effective feature, a probability that the candidate keyword belongs to a target keyword, and determining, according to the calculated probability, whether to use the candidate keyword as the target keyword of the target text. The keyword evaluation model may be a classification model. The processed effective feature corresponding to the candidate keyword may be input to the keyword evaluation model in a feature vector form.

It has been mentioned above that the keyword evaluation model may be an LR model. Because a learning capability of an LR model is limited, to achieve a better classification effect, it is needed to perform complex manual feature engineering, and the GBDT model can replace the complex manual feature engineering. Therefore, in an exemplary embodiment, a GBDT model and an LR model are combined to determine a target keyword.

Figure 4:
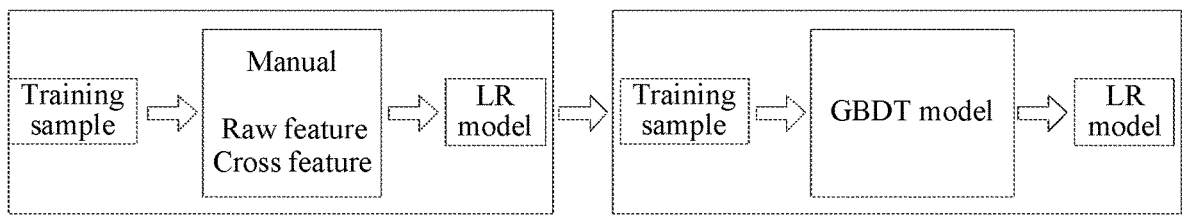
FIG. 4 is a schematic diagram of comparison between manual feature engineering and performing feature processing by using a gradient boosting decision tree (GBDT) model.

FIG. 4 is a schematic diagram of comparison between manual feature engineering and performing feature processing by using a GBDT model. Before fusion, it is needed to manually seeking for a distinguishing feature (e.g., raw feature) and a feature combination (e.g., cross feature), and after the fusion, automated feature processing is directly performed by using the GBDT model.

Figure 5:
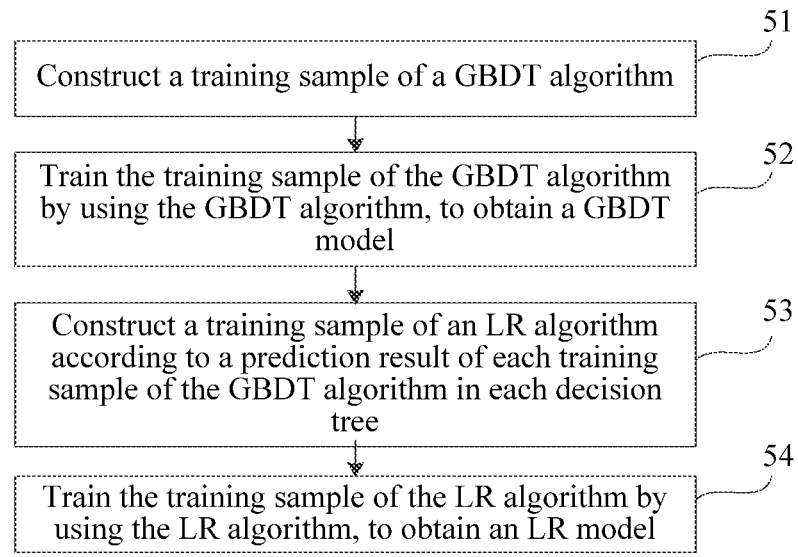
FIG. 5 is a flowchart of a model training process.

FIG. 5 is a flowchart of a model training process. The model training process may include the following operations:

Operation 51: Construct a training sample of a GBDT algorithm.

The training sample of the GBDT algorithm includes a first positive sample and a first negative sample. The first positive sample is a word belonging to the target keyword in sample text, the first positive sample is represented by an effective feature corresponding to the word belonging to the target keyword in the sample text. The first negative sample is a word not belonging to the target keyword in the sample text, and the first negative sample is represented by an effective feature corresponding to the word not belonging to the target keyword in the sample text.

The sample text refers to text in which a target keyword has been marked. The sample text and the marked sample may be the same text or different text.

Operation 52: Train the training sample of the GBDT algorithm by using the GBDT algorithm, to obtain a GBDT model.

The GBDT model includes a plurality of decision trees, each leaf node of the decision tree corresponds to a processed effective feature, and the GBDT model is a feature processing model.

Operation 53: Construct a training sample of an LR algorithm according to a prediction result of each training sample of the GBDT algorithm in each of the decision trees.

The training sample of the LR algorithm includes a second positive sample and a second negative sample. The second positive sample is a word belonging to the target keyword in the sample text, the second positive sample is represented by a processed effective feature corresponding to the word belonging to the target keyword in the sample text. The second negative sample is a word not belonging to the target keyword in the sample text, and the second negative sample is represented by a processed effective feature corresponding to the word not belonging to the target keyword in the sample text.

Operation 54: Train the training sample of the LR algorithm by using the LR algorithm, to obtain an LR model.

The LR model is used for calculating, according to each processed effective feature corresponding to the candidate keyword and a weighting coefficient respectively corresponding to each processed effective feature, a probability that the candidate keyword belongs to a target keyword, and determining, according to the probability, whether to use the word as the target keyword. The LR model is a keyword evaluation model.

Figure 6:
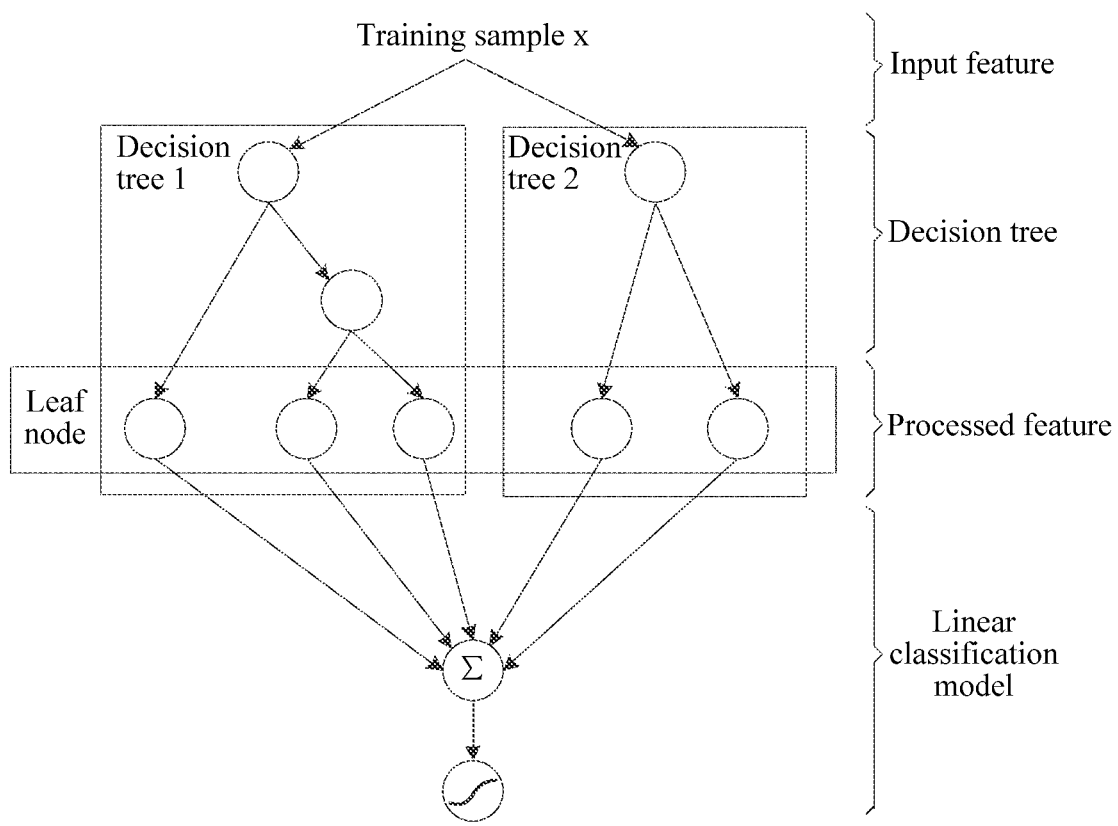
FIG. 6 is a schematic diagram of fusion between a GBDT model and a logistic regression (LR) model.

FIG. 6 is a schematic diagram of fusion between a GBDT model and an LR model.

In FIG. 6, a decision tree 1 and a decision tree 2 are two decision trees included by the GBDT model trained by using the GBDT algorithm, x is a training sample of a GBDT algorithm, after the two decision trees are traversed, the training sample x falls respectively into leaf nodes of the two decision trees, each leaf node corresponds to a one-dimensional feature of the LR model, and after each decision tree is traversed, all LR features corresponding to the training sample x are obtained.

Assuming that the training sample x falls into the second leaf node from the left to the right in the decision tree 1, and also falls into the second leaf node from the left to the right in the decision tree 2, a training sample of the LR algorithm corresponding to the training sample x may be represented as (0, 1, 0, 0, 1). Because each path of the decision tree is a distinguishing path that is finally segmented by means of a method such as a minimum mean-square error method, a feature or a feature combination obtained according to the path is relatively distinguishing, and an effect is theoretically as good as an experienced manual processing manner.

In an exemplary embodiment, a combination of the GBDT algorithm and the LR algorithm is applied to keyword extraction, so as to convert a keyword extraction process to a simple binary classification process, and can replace complex manual feature engineering.

Optionally, after the foregoing operation 103 or operation 304, the following operation is further included: according to each target keyword of the target text and a probability respectively corresponding to each target keyword of the target text, ranking respective target keywords of the target text, to obtain a target keyword sequence, so as to present a correlation degree between each target keyword of the target text and the target text by using the target keyword sequence.

For example, when the keyword evaluation model is the LR model introduced above, because the LR model calculates a probability that the candidate keyword belongs to the target keyword, and determines, according to the probability, whether to use the candidate keyword as the target keyword of the target text. Therefore, the probability corresponding to the target keyword reflects a correlation degree between the target keyword and the text.

In addition, respective target keywords of the target text are ranked according to probabilities respectively corresponding to the target keywords in descending order, to obtain a keyword sequence, and a target keyword having high correlation with the text is preferentially displayed. For example, if the target text includes 10 candidate keywords, where probabilities corresponding to 4 candidate keywords are greater than 0.5, probabilities corresponding to the remaining 6 candidate keywords are less than or equal to 0.5, the 4 candidate keywords are determined as target keywords of the target text. Assuming that in the foregoing 4 keywords, probabilities corresponding to the keywords A, B, C, and D are respectively 0.75, 0.66, 0.94, and 0.88, the target keywords are ranked according to the probabilities respectively corresponding to the target keywords, and a target keyword sequence obtained by ranking the target keywords of the target text is sequentially: a keyword C, a keyword D, a keyword A, and a keyword B.

In the foregoing manner, respective target keywords of the target text are ranked, so as to present a correlation degree between each target keyword and the target text.

It should be noted that after a model is obtained by training, the model may further be evaluated by means of the following operations: testing the keyword evaluation model by using a test sample; and obtaining a quality evaluation parameter of the keyword evaluation model according to a test result. The test sample refers to text in which a target keyword has been marked, and different text should be selected as the test sample and the training sample. A target keyword in the test sample is extracted by using the keyword evaluation model, and the extracted target keyword is compared with the target keyword that has been marked in advance, to obtain a test result. In an actual application, a plurality of test samples may be selected, and statistics collection and calculation is performed on the test result respectively corresponding to the plurality of test samples to obtain a quality evaluation parameter of the keyword evaluation model. The quality evaluation parameter includes at least one of precision, a recall rate, and ranking precision.

The precision refers to a ratio of a quantity of correct extracted target keywords to a total quantity of extracted target keywords. The recall rate refers to a ratio of a quantity of correct extracted target keywords to a total quantity of manually marked target keywords. For example, for a specific test sample, assuming that manually marked target keywords include: A, B, C, and D, and the target keywords extracted by means of the foregoing operation 301 to 304 include A, C, D, E, and F, a quantity of correct extracted target keywords is 3, precision is 0.6, and a recall rate is 0.75. When there is a plurality of test samples, a mean of precision corresponding to the respective test samples can be obtained, and the obtained mean of precision is used as the precision of the keyword evaluation model. When there is a plurality of test samples, an average of recall rates corresponding to the respective test samples can be obtained, and the obtained average of recall rates is used as the recall rate of the keyword evaluation model.

Because precision of ranking respective target keywords also reflects quality of a model to some extent, the quality evaluation parameter of the model may further include ranking precision. The ranking precision may be represented by some evaluation indicators in search ranking, for example, Precision@N (or P@N, precision at an $N^{th}$ location), mean average precision (MAP), or normalized Discounted Cumulative Gain (nDCG).

In an example, using PAN as an example, PAN indicates a probability of being a correct target keyword in the first N extracted target keywords. N is a preset positive integer. For example, N is set to 5, assuming that 7 target keywords are extracted from a specific test sample, and the 7 target keywords are ranked according to probabilities corresponding to the respective target keywords in descending order, to obtain a target keyword sequence, first 5 target keywords (that is, 5 target keyword corresponding to the maximum probabilities) are selected from the foregoing target keyword sequence, and assuming that a quantity of correct target keywords is 4, ranking precision corresponding to the test sample may be represented as: P@5=4/5=0.8.

In another example, using the MAP as an example, its definition is obtaining a mean of average precision corresponding to the respective pieces of text. The precision is averaged twice herein, and therefore, is referred to as mean average precision. A measurement criterion of the MAP is relatively unitary, a relationship between one piece of text and one extracted target keyword is 0 or 1, and accuracy evaluation on the ranking result is performed by using a location of a target keyword extracted from text in the target keyword sequence.

A calculation formula of average precision (AP) corresponding to a piece of text is as follows:

$$AP(q) = \left(\sum_{j=1}^{n} \frac{i}{j}\right) / n,$$

where

AP(q) represents average precision corresponding to text q, j represents a sequence number of a target keyword extracted from the text q in a target keyword sequence, n represents a quantity of target keywords extracted from the text q, and j, n are positive integers. If the $j^{th}$ target keyword is corrected to text q (that is, the $j^{th}$ target keyword is a correct target keyword), a value of i corresponding to the $j^{th}$ target keyword is a sequence number of the $j^{th}$ target keyword that is the correct target keyword (the sequence number of the correct target keyword is counted from 1); otherwise, if the $j^{th}$ target keyword is not correlated to text q (that is, the $j^{th}$ target keyword is not a correct target keyword), a value of i corresponding to the $j^{th}$ target keyword is 0.

A calculation formula of mean average precision (MAP) corresponding to a plurality of pieces of text is as follows:

$$MAP(q_1, q_2, \ldots, q_m) = \left(\sum_{k=1}^{m} AP(q_k)\right) / m,$$

where $MAP(q_1, q_2, \ldots, q_m)$ represents a mean of average precision corresponding to m pieces of text, $AP(q_k)$ represents average precision corresponding to the $k^{th}$ text, k is a positive integer, and m is an integer greater than 1.

For example, assuming that a quantity of target keywords extracted from text $q_1$ is 5, a target keyword sequence is obtained by ranking the target keywords according to probabilities corresponding to the respective target keywords in descending order, and in the target keyword sequence, the first, third, and fifth target keywords are correct target keywords, $AP(q_1)=(1/1+0+2/3+0+3/5)/5=0.45$. For example, assuming that a quantity of target keywords extracted from text $q_2$ is 6, a target keyword sequence is obtained by ranking the target keywords according to probabilities corresponding to the respective target keywords in descending order, and in the target keyword sequence, the first, second, fourth, and sixth target keywords are correct target keywords, $AP(q_2)=(1/1+2/2+0+3/4+0+4/6)/6=0.57$. A value of MAP corresponding to the two pieces of text (that is, text $q_1$ and text $q_2$) is $(AP(q_1)+AP(q_2))/2=(0.45+0.57)/2=0.51$.

In another example, the nDCG is used as an example, and nDCG is an indicator of comprehensively considering a relationship between a model ranking result and an actual sequence, and is also a common indicator for measuring accuracy of the ranking result. Its calculation formulas are as follows:

$$DCG(q) = \sum_{j=1}^{n} \frac{2^{r(j)} - 1}{\log_2(1 + j)};$$

and $$nDCG(q) = Z_n DCG(q), \text{ where}$$

DCG(q) represents an attenuation accumulated entropy of a target keyword sequence corresponding to text q, j represents a sequence number of a target keyword extracted from the text q in the target keyword sequence, and r(j) represents a probability corresponding to the $j^{th}$ target keyword. The value of log with base 2 is obtained from an empirical formula and does not have a theoretical basis. Actually, the base of the log can be modified according to an actual requirement. $Z_n$ represents a reciprocal of the DCG corresponding to an ideal ranking result, and if the nDCG is greater, it indicates that the target keyword sequence obtained by the model is closer to the ideal ranking result. In an actual application, the ideal ranking result may be manually preset.

In addition, when there is a plurality of test samples, a mean of ranking precision corresponding to the respective test samples can be obtained, and the obtained mean of ranking precision is used as the ranking precision of the keyword evaluation model.

In the foregoing manner, a keyword evaluation model is evaluated by using test samples, so as to facilitate determining, according to the quality evaluation parameter, whether a model obtained by training satisfies a prediction precision requirement. If the prediction precision requirement is satisfied, the model can be used for online prediction, and if the prediction precision requirement is not satisfied, the training sample (for example, further adding training sample) may be adjusted, and the adjusted training sample is trained to obtain a model with higher prediction precision.

It is found by experiments that the GBDT+LR-based keyword extraction method provided in an exemplary embodiment, compared with the keyword extraction method of rule-based multi-feature fusion in the related art technology, has notable improvements in terms of respective quality evaluation parameters, and improves average precision to approximately 80%, while average precision of the keyword extraction method of rule-based multi-feature fusion in provided the related art technology is only 62%, and the average precision is totally improved by 18%. In addition, it is found by experiments that in the GBDT+LR-based keyword extraction method provided in an exemplary embodiment, the MAP indicator corresponding to the trained keyword evaluation model reaches 85%.

Figure 7:
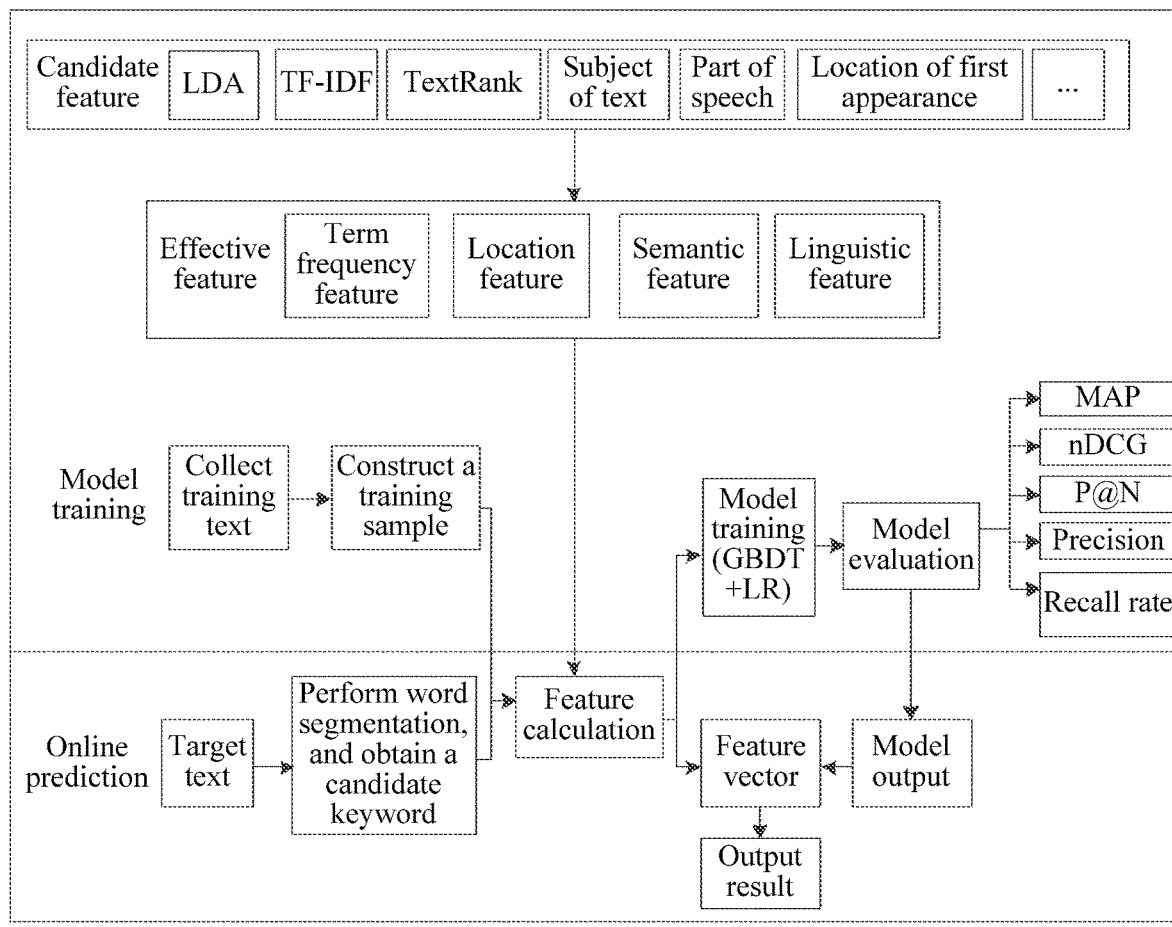
FIG. 7 is an architectural diagram of a technical solution according to an embodiment.

FIG. 7 is an architectural diagram of a technical solution according to an embodiment. A large quantity of candidate features that possibly affect keyword extraction are preset, and an effective feature used for determining whether a keyword is a target keyword is selected by filtration from the candidate features. Types of the effective features at least include: a term frequency feature, a location feature, a semantic feature, and a linguistic feature. In a model training stage, a training sample is used for training a model, and testing and evaluation are performed on the trained model, to obtain a model that satisfies a prediction precision requirement and then, output the mode. For example, a GBDT model and an LR model are used in an exemplary embodiment. In an online prediction stage, target text from which a keyword is to be extracted is obtained, word segmentation is performed on the target text, a candidate keyword is selected, a feature vector constituted by an effective feature corresponding to the candidate keyword is obtained, the feature vector is input to the foregoing output model, and an output result of the model is whether to use the candidate keyword as a target keyword of the target text.

Apparatus exemplary embodiments are described below, and may be used to perform any one of the foregoing method embodiments. For details not disclosed in the apparatus embodiments, details of the method embodiments may be referred to.

Figure 8:
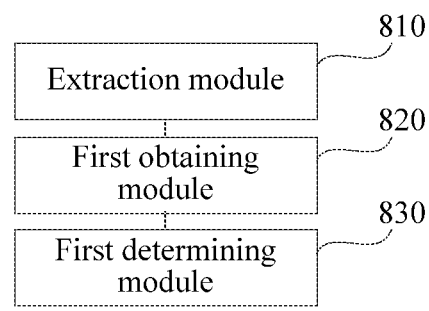
FIG. 8 is a block diagram of a keyword extraction apparatus according to an embodiment.

FIG. 8 is a block diagram of a keyword extraction apparatus according to an embodiment. The keyword extraction apparatus has a function of performing the foregoing method embodiments, the function may be implemented by hardware, software, hardware executing corresponding software, and/or any combination thereof. The apparatus may include: an extraction module 810, a first obtaining module 820, and a first determining module 830.

The extraction module 810 is configured to perform the foregoing operation 101 and/or operation 301.

The first obtaining module 820 is configured to perform the foregoing operation 102 and/or operation 302.

The first determining module 830 is configured to perform the foregoing operation 103 and/or operation 304.

Optionally, the apparatus further includes: a processing module (not shown).

The processing module is configured to perform the foregoing operation 303.

Optionally, the apparatus further includes: a first construction module (not shown) and a first training module (not shown).

The first construction module is configured to perform the foregoing operation 51.

The first training module is configured to perform the foregoing operation 52.

Optionally, the apparatus further includes: a second construction module (not shown) and a second training module (not shown).

The second construction module is configured to perform the foregoing operation 53.

The second training module is configured to perform the foregoing operation 54.

Optionally, the apparatus further includes: a testing module (not shown) and a second obtaining module (not shown).

The testing module is configured to test the keyword evaluation model by using a test sample.

The second obtaining module is configured to obtain a quality evaluation parameter of the keyword evaluation model according to a test result. The quality evaluation parameter includes at least one of precision, a recall rate, and ranking precision.

Optionally, the apparatus further includes: a third obtaining module (not shown), a statistics collecting module (not shown), and a second determining module (not shown).

The third obtaining module is configured to perform the foregoing operation 21.

The statistics collecting module is configured to perform the foregoing operation 22.

The second determining module is configured to perform the foregoing operation 23.

Optionally, the apparatus further includes: a ranking module (not shown).

The ranking module is configured to rank, according to each target keyword of the target text and a probability respectively corresponding to each target keyword of the target text, respective target keywords of the target text, to obtain a target keyword sequence, so as to present a correlation degree between each target keyword of the target text and the target text by using the target keyword sequence.

Optionally, the extraction module 810 includes: a word segmentation unit (not shown) and a selection unit (shown).

The word segmentation unit is configured to perform the foregoing operation 101a.

The selection unit is configured to perform the foregoing operation 101b.

Optionally, when it is determined whether to use the candidate keyword as a target keyword of the target text according to the probability, the first determining module is specifically configured to determine, when the probability is greater than probability threshold, the candidate keyword as the target keyword of the target text.

Descriptions of the foregoing method embodiments may be referred to for related details.

It should be noted that when the apparatus provided in the foregoing embodiment performs a function, the respective function may be performed by one or more corresponding modules, among the foregoing functional modules. In practical application, the foregoing functions may be distributed to different functional modules according to requirements. For example, the internal structure of the device may be divided into different functional modules, so as to perform all or part of the functions described above. In addition, the apparatus provided in the foregoing embodiments and the method embodiments belong to a unity of concept. For example implementation procedures, details of the method embodiments may be referred to, and repetitive details are not described herein again.

Figure 9:
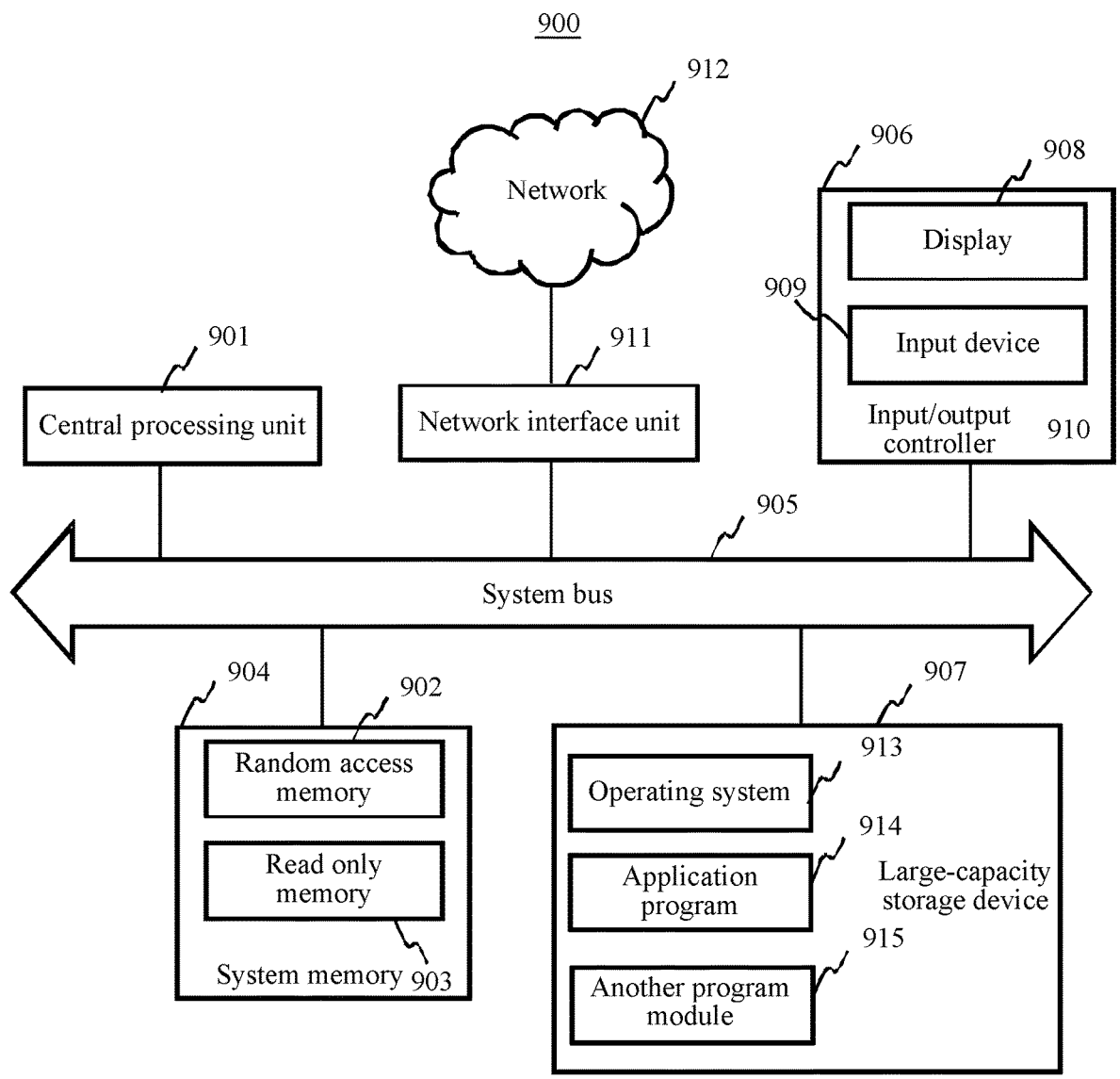
FIG. 9 is a schematic structural diagram of a server according to an embodiment.

FIG. 9 is a schematic structural diagram of a server according to an embodiment. The server is configured to implement the keyword extraction method provided in the foregoing embodiments.

In an exemplary embodiment, the server 900 includes a central processing unit (CPU) 901, a system memory 904 including a random access memory (RAM) 902 and a read only memory (ROM) 903, and a system bus 905 connecting the system memory 904 and the CPU 901. The server 900 further includes a basic input/output system (I/O system) 906 assisting in transmitting information between devices in a computer, and a large-capacity storage device 907 configured to store an operating system 913, an application program 914 and another program module 915.

The basic I/O system 906 includes a display 908 configured to display information and an input device 909, such as a mouse or a keyboard, configured to input information for a user. The display 908 and the input device 909 are connected to the CPU 901 by using an input/output controller 910 connected to the system bus 905. The basic I/O system 906 may further include the input/output controller 910 configured to receive and process inputs from multiple other devices such as a keyboard, a mouse, and an electronic stylus. Similarly, the input/output controller 910 further provides an output to a display screen, a printer or another type of output device.

The large-capacity storage device 907 is connected to the CPU 901 by using a large-capacity storage controller (not shown) connected to the system bus 905. The large-capacity storage device 907 and its associated computer readable medium provide non-volatile storage for the server 900. That is to say, the large-capacity storage device 907 may include the computer readable medium (not shown) such as a hard disk or a CD-ROM driver.

Without loss of generality, the computer readable medium may include a computer storage medium and a communications medium. The computer storage medium includes volatile and non-volatile media, and removable and non-removable media implemented by using any method or technology used for storing information such as a computer readable instruction, a data structure, a program module (or program code) or other data. The computer storage medium includes, for example and not limited to, a RAM, a ROM, an EPROM, an EEPROM, a flash memory or other solid storage technologies; a CD-ROM, a DVD or other optical storages; and a cassette, a magnetic tape, a disk storage or other magnetic storage devices. Certainly, a person skilled in art can know that the computer storage medium is not limited to the foregoing several types. The system memory 904 and the large-capacity storage device 907 may be collectively referred to as a memory.

According to various embodiments, the server 900 may further be connected, by using a network such as the Internet, to a remote computer on the network and run. That is, the server 900 may be connected to a network 912 by using a network interface unit 911 connected to the system bus 905, or may be to connected to another type of network or remote computer system (not shown) by using the network interface unit 911.

The memory further includes one or more programs. The one or more programs are stored in the memory and configured to be executed by one or more processors. The one or more programs include an instruction used to execute the foregoing method.

In an exemplary embodiment, a non-volatile computer readable storage medium including an instruction, such as a memory including an instruction, is further provided, and the instruction may be executed by the processor of the server to perform the respective operations in the foregoing method embodiments. For example, the non-transitory computer readable storage medium may be a ROM, a random access memory (RAM), a CD-ROM, a magnetic tape, a floppy disk, or an optical data storage device.

It should be understood that "a plurality of" mentioned in this application refers to two or more. "And/or" describes an association relationship between associated objects and indicates that there are three relationships. For example, A and/or B may indicate three cases that A individually exists, both A and B exist, and B individually exists. The character "/" usually indicates associated objects before and after "/" are in an "or" relationship.

The sequence numbers of the preceding embodiments are merely for description purpose but do not indicate the preference of the embodiments.

A person of ordinary skill in the art may understand that all or some of the operations of the foregoing embodiments may be performed by using hardware, or may be performed by a program instructing relevant hardware. The program may be stored in a computer readable storage medium. The storage medium may be a read-only memory, a magnetic disk, an optical disc, or the like.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The foregoing descriptions are merely example embodiments, but are not intended to limit this application. Any modification, equivalent replacement, or improvement made within the spirit and principle of the disclosure shall fall within the protection scope of the disclosure.

What is claimed is:

1. A keyword extraction method, comprising:
   extracting, by a server, a candidate keyword from target text;
   obtaining, by the server for each candidate keyword, each effective feature corresponding to the candidate keyword;
   inputting, by the server, each effective feature corresponding to the candidate keyword to a keyword evaluation model, and obtaining a probability that the candidate keyword belongs to a target keyword by using the keyword evaluation model according to each effective feature corresponding to the candidate keyword and a weighting coefficient respectively corresponding to each effective feature; and
   determining the candidate keyword as the target keyword of the target text based on the probability,
   wherein the keyword evaluation model is based on a fusion between a gradient boosting decision tree (GBDT) model and a logistic regression (LR) model, and
   wherein the GBDT model comprises a plurality of decision trees, each leaf node of a decision tree corresponding to a processed effective feature, and a training sample of an LR algorithm, which is trained to obtain the LR model, is constructed according to a prediction result of each training sample of a GBDT algorithm, which is trained to obtain the GBDT model, in each of the plurality of decision trees.

2. The method according to claim 1, further comprising:
   inputting, by the server, each effective feature corresponding to the candidate keyword to a feature processing model, and performing, by using the feature processing model, predetermined processing on each effective feature corresponding to the candidate keyword, to obtain the processed effective feature corresponding to the candidate keyword, wherein
   the processed effective feature corresponding to the candidate keyword is used as an input of the keyword evaluation model, and the predetermined processing comprises at least one of continuous feature discretization processing and feature combination processing.

3. The method according to claim 2, further comprising:
   constructing, by the server, a training sample of the gradient boosting decision tree (GBDT) algorithm;

training, by the server, the training sample of the GBDT algorithm by using the GBDT algorithm, to obtain a GBDT model, the feature processing model being based on the GBDT model, wherein the training sample of the GBDT algorithm comprises a first positive sample and a first negative sample, the first positive sample being a word belonging to the target keyword in sample text and being represented by an effective feature corresponding to the word belonging to the target keyword in the sample text, the first negative sample being a word not belonging to the target keyword in the sample text and being represented by an effective feature corresponding to the word not belonging to the target keyword in the sample text.

4. The method according to any one of claim 3, further comprising:

training, by the server, the training sample of the LR algorithm by using the LR algorithm, to obtain the LR model, the feature processing model being based on the LR model, wherein the training sample of the LR algorithm comprises a second positive sample and a second negative sample, the second positive sample being the word belonging to the target keyword in the sample text and being represented by a processed effective feature corresponding to the word belonging to the target keyword in the sample text, the second negative sample being the word not belonging to the target keyword in the sample text and being represented by a processed effective feature corresponding to the word not belonging to the target keyword in the sample text.

5. The method according to claim 1, further comprising:

testing, by the server, the keyword evaluation model by using a test sample; and obtaining, by the server, a quality evaluation parameter of the keyword evaluation model according to a test result, wherein the quality evaluation parameter comprises at least one of precision, a recall rate, and ranking precision.

6. The method according to claim 1, wherein a type of the effective feature comprises at least one of: a term frequency feature, a location feature, a semantic feature, and a linguistic feature, the term frequency feature indicating a frequency at which a given word appears in text;

the location feature indicating a location at which the given word appears in the text;

the semantic feature indicating correlation between the given word and a subject of the text; and the linguistic feature indicating a basic attribute of the given word.

7. The method according to claim 1, further comprising:

obtaining, by the server, a plurality of candidate features and a plurality of marked samples, each of the plurality of marked samples being text in which the target keyword has been marked;

performing statistics collection, by the server for each candidate feature, on a sample ratio of each feature value of the candidate feature; and in response to a relationship between the sample ratio and a feature value of the candidate feature satisfying a preset condition, determining, by the server, the candidate feature as an effective feature, wherein the sample ratio is a positive sample ratio or a negative sample ratio, the positive sample ratio being a ratio of a quantity of positive samples in the plurality of marked samples to a quantity of the plurality of marked samples, the negative sample ratio being a ratio of a quantity of negative samples in the plurality of marked samples to the quantity of the plurality of marked samples, a positive sample being a marked sample in which the target keyword satisfying the feature value of the candidate feature exists, and a negative sample being a marked sample in which the target keyword satisfying the feature value of the candidate feature does not exist.

8. The method according to claim 1, wherein the determining comprises:

determining the candidate keyword as the target keyword of the target text based on the probability being greater than a probability threshold.

9. A keyword extraction apparatus, comprising:

at least one memory configured to store computer program code; and at least one processor configured to access the at least one memory and operate according to the computer program code, the computer program code including:

extraction code configured to cause the at least one processor to extract a candidate keyword from target text;

first obtaining code configured to cause the at least one processor to obtain, for each candidate keyword, each effective feature corresponding to the candidate keyword; and first determining code configured to cause the at least one processor to input each effective feature corresponding to the candidate keyword to a keyword evaluation model, and obtain a probability that the candidate keyword belongs to a target keyword by using the keyword evaluation model according to each effective feature corresponding to the candidate keyword and a weighting coefficient respectively corresponding to each effective feature, and determine the candidate keyword as the target keyword of the target text based on the probability, wherein the keyword evaluation model is based on a fusion between a gradient boosting decision tree (GBDT) model and a logistic regression (LR) model, and wherein the GBDT model comprises a plurality of decision trees, each leaf node of a decision tree corresponding to a processed effective feature, and a training sample of an LR algorithm, which is trained to obtain the LR model, is constructed according to a prediction result of each training sample of a GBDT algorithm, which is trained to obtain the GBDT model, in each of the plurality of decision trees.

10. The apparatus according to claim 9, wherein the computer program code further comprises:

processing code configured to cause the at least one processor to input each effective feature corresponding to the candidate keyword to a feature processing model, and perform, by using the feature processing model, predetermined processing on each effective feature corresponding to the candidate keyword, to obtain the processed effective feature corresponding to the candidate keyword, wherein the processed effective feature corresponding to the candidate keyword is used as input of the keyword evaluation model, and the predetermined processing comprises at least one of continuous feature discretization processing and feature combination processing.

11. The apparatus according to claim 10, wherein the computer program code further comprises:

first construction code configured to cause the at least one processor to construct a training sample of the gradient boosting decision tree (GBDT) algorithm;

first training code configured to cause the at least one processor to train the training sample of the GBDT algorithm by using the GBDT algorithm, to obtain a GBDT model, the feature processing model being based on the GBDT model, wherein the training sample of the GBDT algorithm comprises a first positive sample and a first negative sample; the first positive sample is a word belonging to the target keyword in sample text, the first positive sample is represented by an effective feature corresponding to the word belonging to the target keyword in the sample text; the first negative sample is a word not belonging to the target keyword in the sample text, and the first negative sample is represented by an effective feature corresponding to the word not belonging to the target keyword in the sample text.

12. The apparatus according to claim 11, wherein the computer program code further comprises:

second training code configured to cause the at least one processor to train the training sample of the LR algorithm by using the LR algorithm, to obtain an LR model, the feature processing model being based on the LR model, wherein the training sample of the LR algorithm comprises a second positive sample and a second negative sample; and the second positive sample is a word belonging to the target keyword in the sample text, the second positive sample is represented by a processed effective feature corresponding to the word belonging to the target keyword in the sample text; and the second negative sample is a word not belonging to the target keyword in the sample text, and the second negative sample is represented by a processed effective feature corresponding to the word not belonging to the target keyword in the sample text.

13. The apparatus according to claim 9, wherein the computer program code further comprises:

testing code configured to cause the at least one processor to test the keyword evaluation model by using a test sample; and second obtaining code configured to cause the at least one processor to obtain a quality evaluation parameter of the keyword evaluation model according to a test result, wherein the quality evaluation parameter comprises at least one of precision, a recall rate, and ranking precision.

14. The apparatus according to claim 9, wherein a type of the effective feature comprises at least one of: a term frequency feature, a location feature, a semantic feature, and a linguistic feature, the term frequency feature indicating a frequency at which a given word appears in text;

the location feature indicating a location at which the given word appears in the text;

the semantic feature indicating correlation between the given word and a subject of the text; and the linguistic feature indicating a basic attribute of the given word.

15. The apparatus according to claim 9, further comprising:

third obtaining code configured to cause the at least one processor to obtain a plurality of candidate features and a plurality of marked samples, each of the plurality of marked samples being text in which the target keyword has been marked;

statistic collecting code configured to cause the at least one processor to perform statistics collection, for each candidate feature, on a sample ratio of each feature value of the candidate feature and;

second determining code configured to cause the at least one processor to: in response to a relationship between the sample ratio and a feature value of the candidate feature satisfying a preset condition, determine the candidate feature as an effective feature, wherein the sample ratio is a positive sample ratio or a negative sample ratio, the positive sample ratio being a ratio of a quantity of positive samples in the plurality of marked samples to a quantity of the plurality of marked samples, the negative sample ratio being a ratio of a quantity of negative samples in the plurality of marked samples to the quantity of the plurality of marked samples, a positive sample being a marked sample in which the target keyword satisfying the feature value of the candidate feature exists, and a negative sample being a marked sample in which the target keyword satisfying the feature value of the candidate feature does not exist.

16. The apparatus according to claim 9, wherein the first determining code causes the at least one processor to determine the candidate keyword as the target keyword of the target text based on the probability being greater than a probability threshold.

17. A server, comprising:

one or more processors; and a memory, the memory storing one or more programs, the one or more programs being configured to be executed by the one or more processors, to implement the keyword extraction method according to claim 1.

18. A non-transitory computer readable media, storing a plurality of instructions, the plurality of instructions, when executed by one or more processors in a server, cause the one or more processors to perform:

extracting a candidate keyword from target text;

obtaining, for each candidate keyword, each effective feature corresponding to the candidate keyword;

inputting each effective feature corresponding to the candidate keyword to a keyword evaluation model, and obtaining a probability that the candidate keyword belongs to a target keyword by using the keyword evaluation model according to each effective feature corresponding to the candidate keyword and a weighting coefficient respectively corresponding to each effective feature; and determining the candidate keyword as the target keyword of the target text based on the probability, wherein the keyword evaluation model is based on a fusion between a gradient boosting decision tree (GBDT) model and a logistic regression (LR) model, and wherein the GBDT model comprises a plurality of decision trees, each leaf node of a decision tree corresponding to a processed effective feature, and a training sample of an LR algorithm, which is trained to obtain the LR model, is constructed according to a prediction result of each training sample of a GBDT algorithm, which is trained to obtain the GBDT model, in each of the plurality of decision trees.

* * * * *